US012663050B2

(12) United States Patent
Zenzen et al.

(10) Patent No.: US 12,663,050 B2
(45) Date of Patent: Jun. 23, 2026

(54) ACTUATOR ASSEMBLY

(71) Applicant: ZF Active Safety GmbH, Koblenz (DE)

(72) Inventors: Guido Zenzen, Macken (DE); Michael Schog, Mertloch (DE)

(73) Assignee: ZF Active Safety GmbH, Koblenz (DE)

( * ) Notice: Subject to any disclaimer, the term of this patent is extended or adjusted under 35 U.S.C. 154(b) by 520 days.

(21) Appl. No.: 17/988,421

(22) Filed: Nov. 16, 2022

(65) Prior Publication Data

US 2023/0151865 A1     May 18, 2023

(30) Foreign Application Priority Data

Nov. 17, 2021     (DE) .......................... 102021129958.6

(51) Int. Cl.
    *F16D 65/18*          (2006.01)
    *B60T 13/74*          (2006.01)
    *F16D 55/226*         (2006.01)
(52) U.S. Cl.
    CPC .......... *F16D 65/186* (2013.01); *B60T 13/746* (2013.01); *F16D 55/2262* (2013.01)
(58) Field of Classification Search
    CPC .................................................... F16D 55/2262
    See application file for complete search history.

(56) References Cited

U.S. PATENT DOCUMENTS

| | | | | | |
|---|---|---|---|---|---|
| 5,107,967 | A | * | 4/1992 | Fujita | ...................... F16D 65/18 |
| | | | | | 188/72.1 |
| 2015/0001010 | A1 | * | 1/2015 | Liao | ........................ F16D 65/18 |
| | | | | | 188/72.3 |
| 2015/0308529 | A1 | * | 10/2015 | Ambs | ..................... H02K 5/225 |
| | | | | | 188/162 |
| 2016/0273602 | A1 | * | 9/2016 | Poertzgen | ............. B60T 13/741 |

FOREIGN PATENT DOCUMENTS

| | | | | | |
|---|---|---|---|---|---|
| CN | 111795093 | A | * | 10/2020 | ............ B60T 13/746 |
| DE | 19944876 | A1 | | 3/2001 | |
| DE | 10064901 | A1 | | 10/2001 | |
| DE | 69810512 | T2 | | 10/2003 | |
| DE | 102016221904 | A1 | | 11/2017 | |
| JP | 2009174585 | A | * | 8/2009 | |
| KR | 101399131 | B1 | * | 5/2014 | |
| WO | WO-2012124811 | A1 | * | 9/2012 | ........... F16D 55/225 |
| WO | WO-2017022586 | A1 | * | 2/2017 | ............. B60T 13/74 |

* cited by examiner

*Primary Examiner* — Melody M Burch
(74) *Attorney, Agent, or Firm* — ROSSI, KIMMS & McDOWELL LLP

(57)          ABSTRACT

An actuator assembly for a vehicle brake, in particular an electromechanical vehicle brake, is specified, having a brake caliper in which there is an intermediate space—for accommodating a brake rotor, a drive housing, in which a drive assembly of the actuator assembly is accommodated, wherein the drive housing is fixedly connected to the brake caliper, a linearly guided actuating slide for a brake pad, which can be moved optionally between a retracted position and an extended position via the drive assembly, and a frame part having an accommodation space, in which a transmis- (Continued)

sion unit of the drive assembly is at least partially accommodated, wherein an electric motor is secured on the frame part, which electric motor is coupled in terms of drive to the actuating slide via the transmission unit and a spindle drive, and the frame part is secured on the drive housing.

19 Claims, 2 Drawing Sheets

ACTUATOR ASSEMBLY

CROSS-REFERENCE TO RELATED APPLICATION

This application claims priority to German Priority Application No. 102021129958.6, filed Nov. 17, 2021, the disclosure of which is incorporated herein by reference in its entirety.

TECHNICAL FIELD

The disclosure relates to an actuator assembly for a vehicle brake, in particular for an electromechanical vehicle brake, having a drive assembly and a linearly guided actuating slide for a brake pad, which can be moved optionally between a retracted position and an extended position via the drive assembly.

BACKGROUND

The existing components of the drive assembly and of the actuating slide must be aligned sufficiently accurately relative to one another to ensure reliable functioning of the vehicle brake.

Furthermore, the axial and transverse forces and torques occurring during operation of the vehicle brake must be reliably supported.

Moreover, the confined space conditions in the vehicle represent a challenge.

SUMMARY

The present disclosure specifies an actuator assembly which, while being of compact design, makes possible in a simple manner the most accurate possible alignment of the existing components with respect to one another and which is sufficiently stable to withstand the forces which occur.

According to the disclosure an actuator assembly for a vehicle brake is disclosed, in particular an electromechanical vehicle brake, having a brake caliper in which there is an intermediate space for accommodating a brake rotor, a drive housing, in which a drive assembly of the actuator assembly is accommodated, wherein the drive housing is fixedly connected to the brake caliper, a linearly guided actuating slide for a brake pad, which can be moved optionally between a retracted position and an extended position via the drive assembly, and a frame part having an accommodation space, in which a transmission unit of the drive assembly is at least partially accommodated, wherein an electric motor is secured on the frame part, which electric motor is coupled in terms of drive to the actuating slide via the transmission unit and a spindle drive. The frame part is secured on the drive housing.

For example, the frame part is screwed to the drive housing.

Since the frame part is secured on the drive housing, which is in turn fixedly connected to the brake caliper, forces which occur during operation can be transmitted from the frame part, via the drive housing, to the brake caliper. In this way, a particularly high stability of the actuator assembly is ensured.

The frame part is furthermore suitable for securing and aligning various components, such as the electric motor, and thus contributes to simple assembly. In particular, inter alia, the electric motor can be pre-mounted on the frame part before the frame part is secured on the drive housing.

A bearing journal can be secured on the frame part, on which journal a gear wheel is mounted which meshes with an output gear wheel, which is arranged on an output shaft of the electric motor. The gear wheel can thus be mounted in a defined position on the frame part, on which the electric motor is also secured, with the result that the gear wheel and the output shaft of the electric motor are aligned relative to one another in a defined position by way of the frame part. This also contributes to a simplification of assembly.

A ring gear of a planetary transmission stage can extend along an inner circumference of the accommodation space. In other words the accommodation space can serve as a positioning aid for aligning the ring gear. Consequently, separate positioning aids are not required. Moreover, the ring gear is supported on the frame part during operation of the actuator assembly.

The gear wheel which meshes with the output gear wheel is coupled, for example, to a sun wheel of the planetary transmission stage, for example via a further gear wheel, which is coupled to a sun wheel of the planetary transmission stage. As a result, a gear transmission is formed which couples the electric motor to the planetary transmission stage, As a result, the electric motor can be arranged parallel to a centre line of the planetary transmission stage and to the actuating slide, contributing to a compact design of the actuator assembly. A length of the actuator assembly can be reduced by such an arrangement.

The actuating slide is guided linearly, in a bearing sleeve for example, wherein a guide for aligning the bearing sleeve is formed on the frame part. The bearing sleeve can thus be positioned accurately in a simple manner relative to the frame part and consequently also relative to the brake caliper. A movement path of the actuating slide is thus also precisely defined.

The guide is formed, for example, by an annular section, into which an extension of the bearing sleeve is inserted. An outer wall of the bearing sleeve is thus supported on an inner wall of the bearing sleeve.

The brake caliper can be in two parts such that the intermediate space for accommodating the brake rotor is formed in a first caliper part, and the bearing sleeve is accommodated in the second caliper part. Manufacturing the brake caliper in two parts makes it a simpler matter to remove the individual caliper parts from the mould. Moreover, mounting of the guide sleeve in the brake caliper is simplified.

The guide sleeve is pressed into the second caliper part, for example.

The second caliper part forms, in particular, a bridge between the drive housing and the first caliper part.

The guide can be arranged concentrically with respect to the accommodation space and the frame part can taper in a funnel shape from the accommodation space to the guide. As a result of the taper, a diameter of the bearing sleeve can be selected independently of a diameter of the ring gear arranged in the accommodation space. As a result of the concentric arrangement of the accommodation space and the guide, a centre line of the planetary transmission stage coincides with a centre line of the actuating slide.

For example, a reinforcing part is provided which spans the accommodation space at the end, wherein the reinforcing part is secured on the frame part and/or on the drive housing. The reinforcing part ensures additional stabilization and stiffening of the drive housing, in particular in the region in which the planetary transmission stage is mounted.

The drive housing can be sleeve-shaped and closed by a housing cover, wherein a control assembly is accommodated in the housing cover. This likewise contributes to a compact construction of the actuator assembly.

The drive housing can be screwed to the brake caliper in different positions, wherein the positions differ in the angular position of the drive housing relative to the brake caliper. In this way, the advantage is achieved that adaptation of the actuator assembly to different installation space situations is possible.

BRIEF DESCRIPTION OF DRAWINGS

Further advantages and features according to the disclosure will be found in the following description and in the accompanying drawings, to which reference is made. In the drawings.

DETAILED DESCRIPTION

Figure 1:
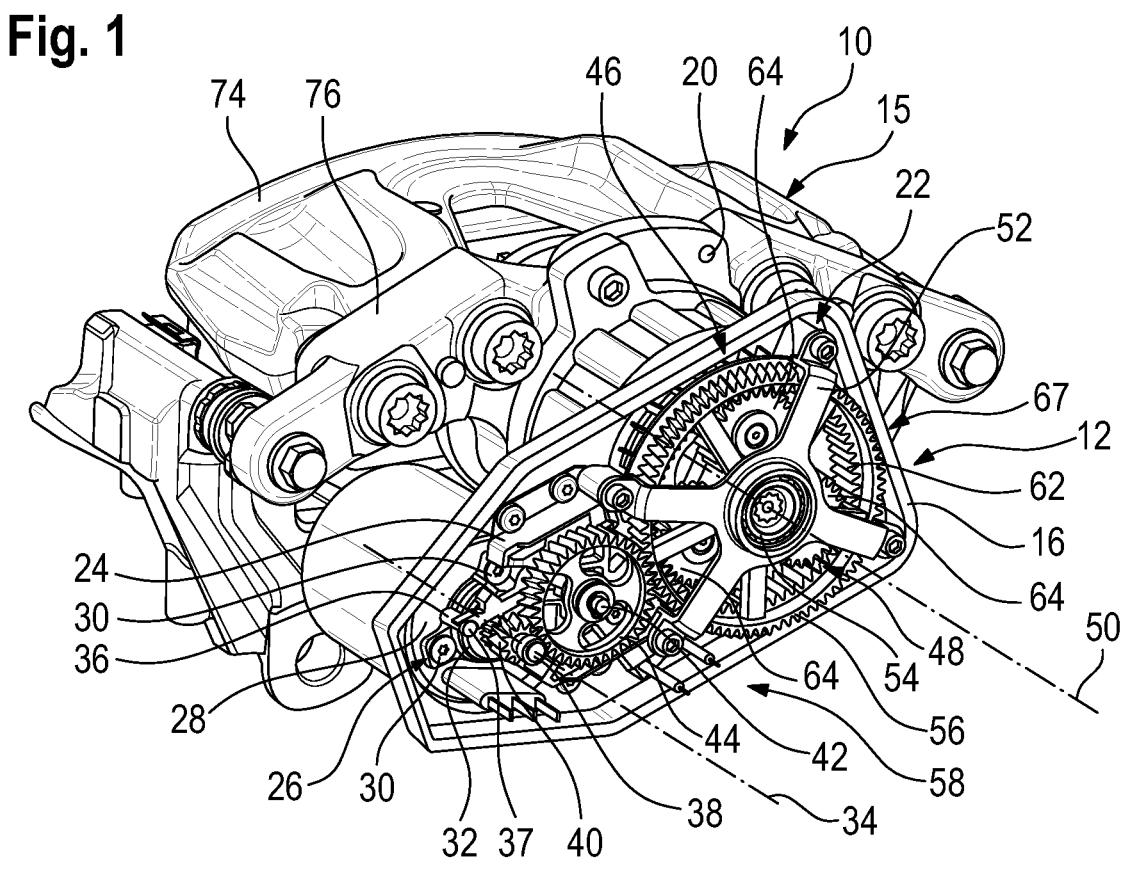
FIG. 1 shows an actuator assembly according to the disclosure.

FIG. 1 shows an actuator assembly 10 as part of an electromechanical vehicle brake.

The actuator assembly 10 comprises a drive assembly 12 that can be assembled as a separate subunit.

Furthermore, the actuator assembly 10 comprises a control assembly 14 (see FIG. 2) that can be assembled as a separate subunit.

The drive assembly 12 is arranged in a drive housing 16.

Figure 2:
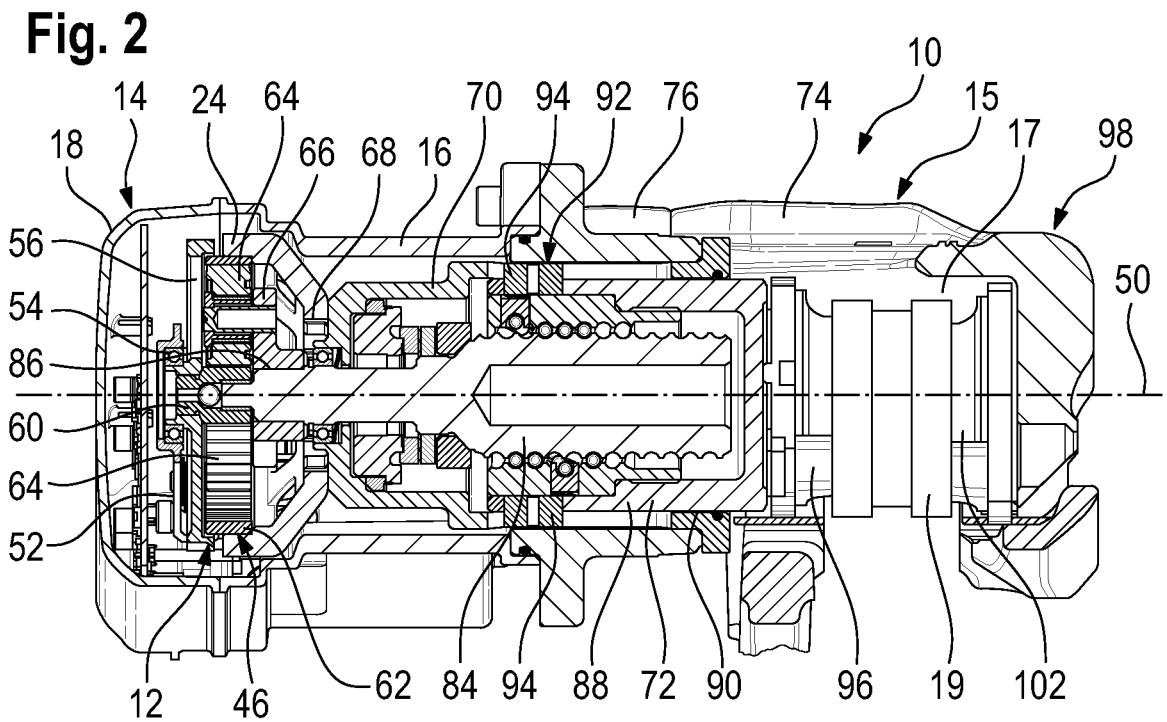
FIG. 2 shows the actuator assembly according to the disclosure from FIG. 1 in a sectional illustration.

The drive housing 16 is substantially sleeve-shaped and is closed on one side by a housing cover 18 (see FIG. 2).

In the illustration, the housing cover 18 is shell-shaped.

The control assembly 14 is accommodated in the housing cover 18. For example, the control assembly 14 is pre-mounted in the housing cover 18 before the housing cover 18 is placed on the drive housing 16.

The drive housing 16 can be a casting, which is produced from metal or plastic.

The housing cover 18 can be made of plastic.

Furthermore, the actuator assembly 10 comprises a brake caliper 15, in which an intermediate space 17 for a brake rotor 19, i.e. a brake disc, is formed.

With its end close to the brake rotor 19, the drive housing 16 is partially pushed onto the brake caliper 15 and fixedly connected, in particular screwed, to the brake caliper 15.

The drive housing 16 can be screwed to the brake caliper 15 in different positions, specifically in two different positions. This can be seen in FIG. 1 via the additional hole 20. The positions differ in the angular position of the drive housing 16 relative to the brake caliper 15.

The drive assembly 12 comprises a carrier assembly 22, which has a frame part 24.

The frame part 24 is, for example, plate-shaped.

For example, the frame part 24 is a casting.

A first fastening interface 26, at which an electric motor 28 is secured, is provided on the plate-shaped frame part 24. The electric motor 28 can be pre-mounted, in particular on the frame part 24.

More precisely, the electric motor 28 is connected to the frame part 24 in a captive manner via the first fastening interface 26. For this purpose, holes 30 are provided in the frame part 24, by way of which the electric motor 28 is secured on the frame part 24 via a screw. Three holes 30 are provided, for example. The frame part 24 absorbs the forces of the electric motor 28 and holds it.

Moreover, a centring device 32 in the form of a cylindrical aperture is arranged in the frame part 24. The electric motor 28 can thus be secured on the frame part 24 in a centred manner with respect to a centre line 34 of the first fastening interface 26.

In addition, an anti-rotation device 36 in the form of an aperture is provided in the frame part 24, said aperture being designed to prevent the electric motor 28 from rotating with respect to the frame part 24, in particular via an additional retention pin 37.

An output gear wheel 40 is arranged on an output shaft 38 of the electric motor 28 in order to introduce torque into the drive assembly 12.

In addition, a bearing journal 42 is secured on the frame part 24 and a gear wheel 44 is mounted on the said bearing journal and meshes with the output gear wheel 40.

Moreover, an accommodation space 46 for a planetary transmission stage 48 is provided on the frame part 24.

The accommodation space 46 is cylindrical.

A centre line 50 of the accommodation space 46 is arranged substantially parallel to the centre line 34 of the first fastening interface 26.

Furthermore, a reinforcing part 52 is secured on the frame part 24 in such a way that it spans the accommodation space 46 axially at the end with respect to the centre line 50.

The reinforcing part 52 is secured on, in particular screwed to, the frame part 24 and/or the drive housing 16.

As an alternative or in addition, at least some screws for securing the reinforcing part 52 can project through the frame part 24 and be screwed into the drive housing 16.

As illustrated, the reinforcing part 52 is substantially cruciform.

Moreover, a bearing location 54 for a gear wheel 56 arranged coaxially with the planetary transmission stage 48 is provided on the reinforcing part 52.

Gear wheel 56 meshes with gear wheel 44.

Consequently, a gear transmission 58 is formed by gear wheel 44 and gear wheel 56, the output gear wheel 40 acting as the input member of the said gear transmission.

Figure 3:
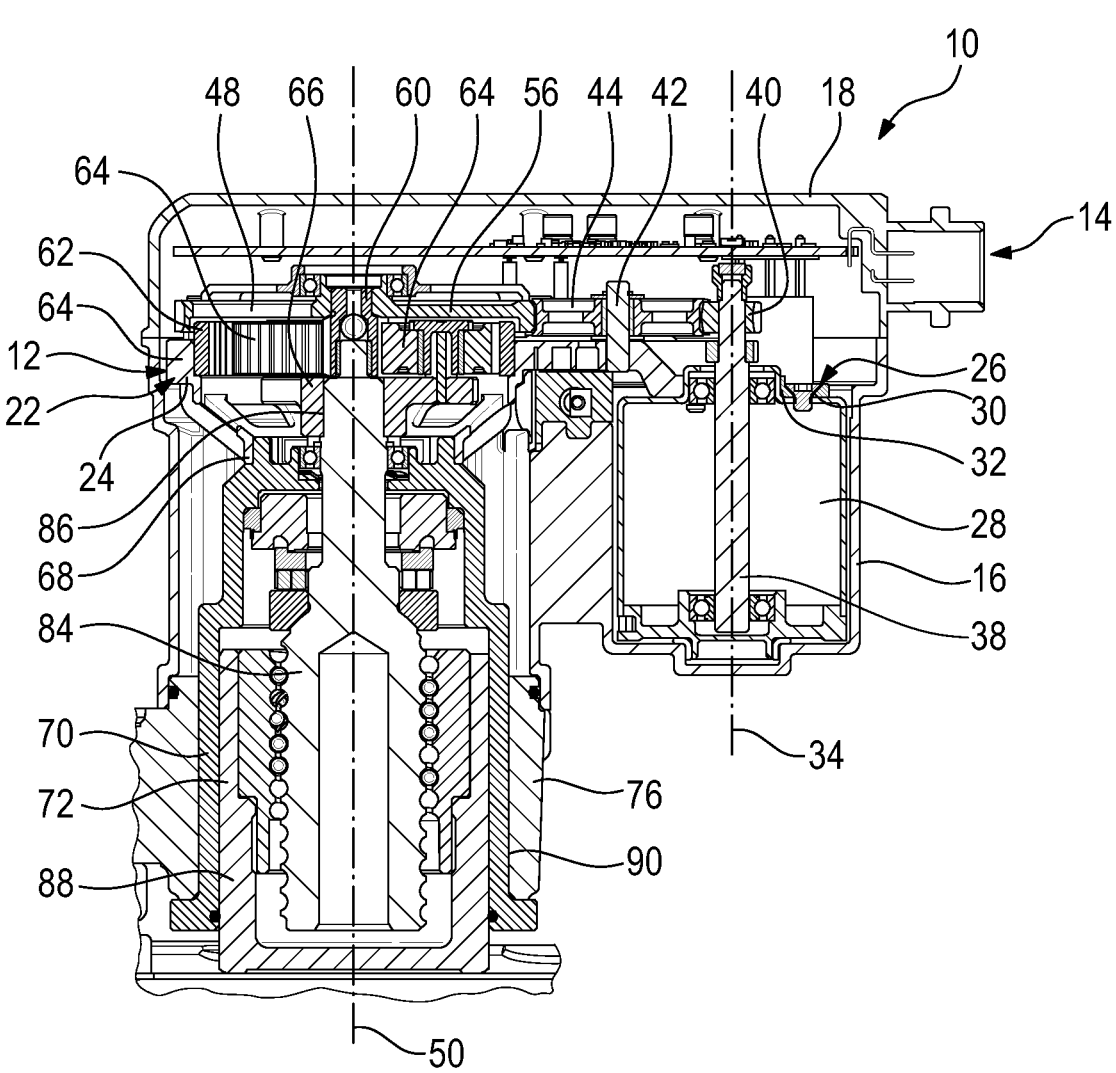
FIG. 3 shows the actuator assembly according to the disclosure from FIG. 1 in a further sectional illustration.

Furthermore, gear wheel 56 is coupled to a sun wheel 60 of the planetary transmission stage 48 (see FIGS. 2 and 3). In this way, the gear transmission 58 and the planetary transmission stage 48 are coupled in terms of drive. Specifically, gear wheel 44 is coupled to the sun wheel 60 of the planetary transmission stage 48 via gear wheel 56.

It is optionally also possible for gear wheel 56 to be formed in one piece with the sun wheel 60 of the planetary transmission stage 48.

The planetary transmission stage 48 furthermore comprises a ring gear 62, which extends along an inner circumference of the accommodation space 46.

As illustrated, a total of three planet wheels 64 is provided between the sun wheel 60 and the ring gear 62 in terms of drive. These are mounted rotatably on a planet carrier 66 (see FIGS. 2 and 3).

In this case, the planet carrier 66 represents an output element of the planetary transmission stage 48.

The gear transmission 58 and the planetary transmission stage 48 are also referred to jointly as a transmission unit 67.

The transmission unit 67 is partially accommodated in the accommodation space 46. More precisely, the planetary transmission stage 48 is partially accommodated in the accommodation space 46.

The frame part 24 thus serves for pre-mounting and alignment of various components.

In particular, the components secured on the frame part 24 can be mounted on the drive housing 16 by securing the frame part 24 in a defined position on the drive housing 16, as shown in FIG. 1.

Moreover, the frame part 24 has a guide 68 for aligning a bearing sleeve 70.

In this case, a centre line of the guide 68 coincides with the centre line 50 of the accommodation space 46 and, for this reason, is provided with the same reference sign.

The frame part 24 tapers in a funnel shape from the accommodation space 46 towards the guide 68.

The guide 68 is arranged concentrically with respect to the accommodation space 46.

The bearing sleeve 70 is accommodated in the brake caliper 15.

The brake caliper 15 is in two parts and has a first caliper part 74, in which the intermediate space 17 for accommodating the brake rotor 19 is formed, and a second caliper part 76, in which the bearing sleeve 70 is accommodated.

The two caliper parts 74, 76 are screwed together.

For example, the bearing sleeve 70 is pressed into the second caliper part 76 or welded thereto.

A spindle drive 72 is accommodated in the bearing sleeve 70.

This comprises a spindle 84, which in the present case is designed as a recirculating ball screw (see FIGS. 2 and 3).

In this case, the spindle 84 is connected for conjoint rotation to the planet carrier 66 via a toothed section 86.

Thus, the spindle drive 72 can be driven via the electric motor 28. In detail, the electric motor 28 is coupled in terms of drive to the spindle drive 72 via the gear transmission 58 and the planetary transmission stage 48.

An actuating slide 88 is mounted on the spindle 84 and is designed, in particular, as a spindle nut of piston-shaped configuration.

Here, rotation of the spindle 84 causes an axial movement of the actuating slide 88 along the centre line 50.

In this case, the actuating slide 88 is guided along the centre line 50 in the bearing sleeve 70, more precisely on a running surface 90, which is formed on an inner side of the bearing sleeve 70. The running surface 90 corresponds substantially to a cylinder lateral surface forming the inner circumference of the bearing sleeve 70.

Furthermore, the actuating slide 88 is prevented from performing a relative rotation about the centre line 50 via an anti-rotation device 92, which is designed as at least one oblong hole in the bearing sleeve 70. For this purpose, at least one anti-rotation element 94 is attached to the actuating slide 88 and engages in each case in an oblong hole (see FIG. 1). The anti-rotation element 94 is a radial extension.

The bearing sleeve 70 is open towards the intermediate space 17, and therefore the actuating slide 88 can be moved into the intermediate space 17.

The actuating slide 88 is used to apply a first brake pad 96 of a brake caliper assembly 98 to the brake rotor 19. That is to say that the first brake pad 96 can be actively moved via the actuator assembly 10 towards a brake rotor 19, which is designed as a brake disc.

In detail, the actuating slide 88 is optionally transferred via the electric motor 28, via the gear transmission 58, the planetary transmission stage 48 and the spindle drive 72, into an extended position associated with the application of the first brake pad 96 to the brake rotor 19.

As a result of the reaction forces acting within the actuator assembly 10 and the brake caliper assembly 98, a second brake pad 102 is thereby also applied to the brake rotor 19.

It is self-evident that, by operating the electric motor 28, the actuating slide 88 can be moved in the same way into a retracted position, which is associated with lifting the first brake pad 96 and the second brake pad 102 from the brake rotor 19.

In the present case, the actuator assembly 10 is designed to be free of self-locking, with the result that, owing to inherent elasticities in the system, the actuating slide 88 also moves back automatically into the retracted position when it is no longer actively being pushed into the extended position via the electric motor 28.

The invention claimed is:

1. An actuator assembly for a vehicle brake comprising:
   a brake caliper in which there is an intermediate space for accommodating a brake rotor;
   a drive housing, in which a drive assembly of the actuator assembly is accommodated, wherein the drive housing is fixedly connected to the brake caliper;
   a linearly guided actuating slide for a brake pad, which can be moved optionally between a retracted position and an extended position by means of the drive assembly; and
   a frame part having an accommodation space, in which a transmission unit of the drive assembly is at least partially accommodated, the transmission unit being located on an opposite side of the frame part from the brake caliper, wherein an electric motor is secured on the frame part, the electric motor being coupled to the actuating slide via the transmission unit and a spindle drive,
   wherein the frame part is secured on a portion of the drive housing located on an opposite side of the drive assembly from a front portion of the drive housing that is closed by a housing cover,
   wherein the actuating slide is guided linearly in a bearing sleeve, and
   wherein a guide for aligning the bearing sleeve is formed on the frame part.

2. The actuator assembly according to claim 1, wherein a bearing journal is secured on the frame part, on which journal a first gear wheel is mounted which meshes with an output gear wheel.

3. The actuator assembly according to claim 1, wherein a ring gear of a planetary transmission stage extends along an inner circumference of the accommodation space.

4. The actuator assembly according to claim 2, wherein the first gear wheel, which meshes with the output gear wheel, is coupled to a sun wheel of a planetary transmission stage.

5. The actuator assembly according to claim 1, wherein the brake caliper is in two parts and the intermediate space for accommodating the brake rotor is formed in a first caliper part, and the bearing sleeve is accommodated in a second caliper part.

6. The actuator assembly according to claim 1, wherein the guide for aligning the bearing sleeve is arranged concentrically with respect to the accommodation space.

7. The actuator assembly according to claim 1, wherein a reinforcing part is provided which spans the accommodation space.

8. The actuator assembly according to claim 1, wherein the drive housing is sleeve-shaped.

9. The actuator assembly according to claim 1, wherein the drive housing can be screwed to the brake caliper in different positions.

10. The actuator assembly according to claim 2, wherein the output gear wheel is arranged on an output shaft of the electric motor.

11. The actuator assembly according to claim 4, wherein the output gear wheel is coupled to the sun wheel of the planetary transmission stage via a second gear wheel.

12. The actuator assembly according to claim 6, wherein the frame part tapers in a funnel shape from the accommodation space to the guide.

13. The actuator assembly according to claim 7, wherein the reinforcing part is secured on the frame part.

14. The actuator assembly according to claim 7, wherein the reinforcing part is secured on the drive housing through the frame part.

15. The actuator assembly according to claim 8, wherein a control assembly is accommodated in the housing cover.

16. The actuator assembly according to claim 9, wherein the positions differ in an angular position of the drive housing relative to the brake caliper.

17. The actuator assembly according to claim 1, wherein the electric motor is coupled to the actuating slide, such that the electric motor drives the actuating slide.

18. The actuator assembly according to claim 1, wherein a movement path of the actuating slide is determined by the arrangement of the bearing sleeve.

19. An actuator assembly for a vehicle brake comprising:

a brake caliper in which there is an intermediate space for accommodating a brake rotor;

a drive housing, in which a drive assembly of the actuator assembly is accommodated, wherein the drive housing is fixedly connected to the brake caliper;

a linearly guided actuating slide for a brake pad, which can be moved optionally between a retracted position and an extended position by means of the drive assembly; and a frame part having an accommodation space, in which a transmission unit of the drive assembly is at least partially accommodated, the transmission unit being located on an opposite side of the frame part from the brake caliper, wherein an electric motor is secured on the frame part, the electric motor being coupled to the actuating slide via the transmission unit and a spindle drive, wherein the frame part is secured on a portion of the drive housing located on an opposite side of the drive assembly from a front portion of the drive housing that is closed by a housing cover, wherein the drive housing can be screwed to the brake caliper in different positions, and wherein the positions differ in an angular position of the drive housing relative to the brake caliper.

\* \* \* \* \*